Aug. 11, 1931.　　　H. J. MURPHY　　　1,818,347
LUBRICATING SYSTEM
Filed Oct. 9, 1926
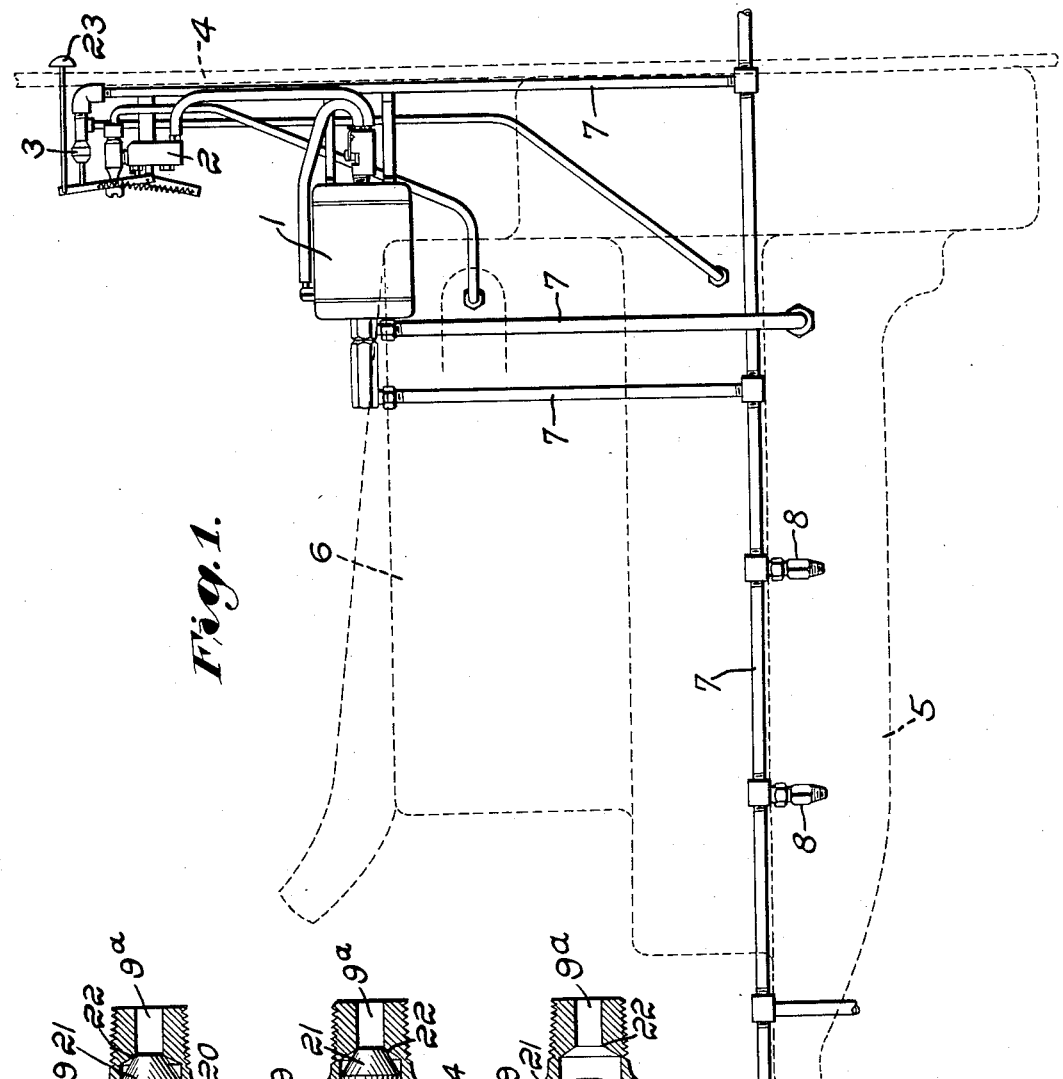
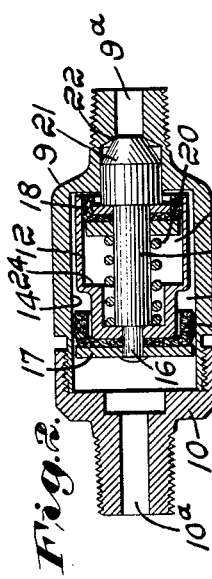
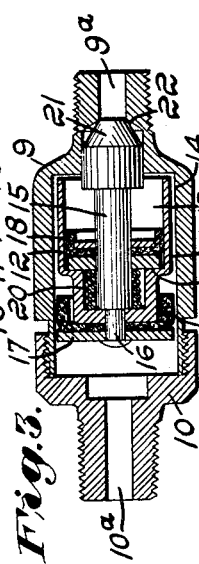
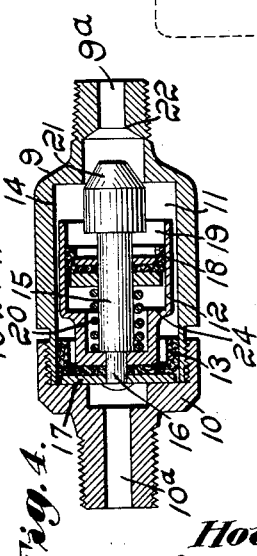
Inventor
Howard J. Murphy,
by Emery, Booth, Janney & Varney
Attys.

Patented Aug. 11, 1931

1,818,347

UNITED STATES PATENT OFFICE

HOWARD J. MURPHY, OF READING, MASSACHUSETTS, ASSIGNOR, BY MESNE ASSIGNMENTS, TO ALEMITE CORPORATION, OF CHICAGO, ILLINOIS, A CORPORATION OF DELAWARE

LUBRICATING SYSTEM

Application filed October 9, 1926. Serial No. 140,517.

This invention aims to provide improvements in a central lubricating system and more particularly in measuring devices for use in a central system.

In the drawings, which illustrate a preferred embodiment of my invention:

Figure 1 is a general view of a central lubricating system for a motor vehicle, the motor being shown in dotted lines; and Figs. 2, 3 and 4 are views of a measuring cup, partly in elevation, and partly in cross-section, showing the successive steps of operation of the means within the cups after the lubricant in the pipe system has been placed under pressure.

Referring to the embodiment of my invention illustrated in the drawings, I have shown a central lubricating system particularly, though not exclusively, adapted for lubricating the several bearings of the chassis of a motor vehicle as shown in Fig. 1.

The system includes a pump 1, a control device 2 for starting and stopping the pump, and a lubricant pressure-controlled relief device 3 all secured to the dash 4 (shown in dotted lines) of the vehicle. The lubricant reservoir in this instance is the crankcase 5 of the motor 6. A pipe system 7 and lubricant measuring devices 8 are also included in the system.

While the pump 1 and the two control devices 2 and 3 may be of any suitable construction and operable in any suitable manner, I prefer to have them constructed and operated along with the remainder of the system, except the measuring cups 8, substantially as more fully described and illustrated in my co-pending application Serial No. 80,245, filed January 9th, 1926.

Each of the lubricant measuring cups 8, as shown in Figs. 2, 3 and 4, has a body formed of two pieces 9 and 10 threaded together and providing therewithin a chamber 11 in which operates the means for measuring and expelling the lubricant. The part 10 has an inlet passage 10a connecting the pipe system 7 with the chamber 11, and the part 9 has an outlet passage 9a which communicates directly with a passage or pipe (not shown) leading to a part to be lubricated (also not shown). The expelling and measuring means is assembled as a unit and is reciprocable in the chamber 11. The unit comprises a hollow part 12 slightly smaller in diameter than the diameter of the chamber 11. This part is fully open at one end and closed at the other end. The last mentioned end is reduced to permit an annular portion of a cup leather, or piston 13, to extend between the part 12 and the wall 14 surrounding the chamber 11. A valve-presenting part 15 extends axially within the part 12 and is riveted to the closed end to hold it in assembled relation thereto. The rivet portion 16 passes through the cup leather 13 and is headed over against a metallic washer 17.

Before riveting the parts together as above described, a second cup washer or piston 18 is assembled with the part 15, so as to be slidable thereon in the chamber 19 provided in the part 12. A spring 20 also surrounds the part 15, and normally presses the piston 18 against the valve 21 to close the open end of the part 12 as shown in Fig. 2.

The seat 22 for the valve 21 is provided by the part 9, between the chamber 11 and the outlet passage 9a.

When it is desirable to lubricate the bearings of the chassis of the motor vehicle to which the system is applied, the operator merely operates the button 23 located at the dash 4 (see Fig. 1) and the remaining operations take place automatically until the pump ceases to force lubricant to the cups 8.

As the pump begins to operate, it draws lubricant from the crankcase 5 and forces it under pressure through the pipe system 7 to the cups 8. At first the lubricant under pressure will shift the measuring and expelling unit in each cup into valve closing position, as shown in Fig. 2, if not already in such position. Then the lubricant cannot pass directly to the parts to be lubricated. As the pressure increases the lubricant passes by the piston 13 into the chamber 11 and around the part 15. As the pressure increases, the lubricant begins to press the piston 18 in each cup inwardly in the chamber 19 until it abuts against the shoulder 24, thus filling the chamber 19 with lubricant, as shown in Fig. 3.

After the cups have been filled as above described, the pump continues to raise the pressure of the lubricant in the pipe system until it reaches a pressure sufficient to operate the device 3. This device acts upon the device 2 in such a manner as to stop the motor and bypass the lubricant from the pipe system 7 back to the crankcase 5, as more fully described in my above-mentioned co-pending application.

So far no lubricant has passed to the parts to be lubricated, but as soon as the pressure is reduced in the system 7 the lubricant under pressure in the cups, which cannot escape back into the pipe system because of the cup washers 18, with the aid of the spring 20, will shift the inner parts of the cups as a unit into the position shown in Fig. 3. Thus the valve 21 will be unseated and the lubricant may pass from the chamber 19 through the outlet passage 9a in each cup to the parts to be lubricated. The spring 20 will move the piston 18 relative to the part 12 and force all the lubricant from the chamber 19. Thus a predetermined quantity of lubricant is forced from each cup to each part to be lubricated by the central system.

The cups are simple in construction and operation, the pistons 13 and 18 being so arranged that lubricant may be forced by the piston 13 into the chamber 11 but cannot return. The piston 18 is movable by the pressure of the lubricant to enlarge the space within the cup which may be filled with lubricant. The parts within the cups operate automatically so that when there is substantial pressure in the pipe system 7 the cups may be filled and when the pressure is relieved a valve in each cup will be opened automatically and a predetermined quantity of lubricant will be forced from each cup to a part to be lubricated.

While I have shown and described a preferred embodiment of my invention, it should be understood that I do not wish to be limited to such disclosure and description, my invention being best defined in the following claims.

Claims:

1. In a central lubricating system, a lubricant cup, means for supplying lubricant to said cup under pressure and for reducing the pressure subsequent to said cups being filled, valvular means for preventing direct passage of lubricant through said cup, piston means in said cup having a flexible washer permitting passage of lubricant thereby into said cup but preventing return, and a second piston slidable relative to said piston means to permit filling of said cup and for forcing lubricant from said cup subsequent to opening said valvular means.

2. In a central lubricating system, a lubricant cup, means for supplying lubricant to said cup under pressure and for reducing the pressure subsequent to said cups being filled, a piston reciprocable in said cup and constructed to permit lubricant to pass thereby into said cup, a valve operably connected to said piston and adapted to be held closed while said cup is being filled with lubricant and to be opened upon the lubricant pressure being reduced and a second piston operatively disposed between the valve and said first piston to permit filling of said cup and for forcing the lubricant therefrom subsequent to said valve being opened by movement of said first-mentioned piston.

3. In a central lubricating system, a lubricant cup, means for supplying lubricant to said cup under pressure and for reducing the pressure subsequent to said cups being filled, a piston reciprocable in said cup and constructed to permit lubricant to pass thereby into said cup, a valve operably connected to said piston and adapted to be held closed while said cup is being filled with lubricant and to be opened upon the lubricant pressure being reduced and a second piston operatively disposed between the valve and said first piston to be operated by the lubricant to enlarge the area within the cup which may be filled with lubricant and a spring for operating said second piston to force lubricant from said cup subsequent to said valve being opened.

4. In a central lubricating system having a source of lubricant supply, pump means, and a pipe system, a plurality of lubricant measuring devices connected by said pipe system with said pump to receive lubricant under pressure therefrom, and lubricant pressure operated by-pass means for automatically reducing the pressure of the lubricant in said pipe system when said cups are filled, each of said measuring devices comprising a lubricant cup having a chamber adapted to be filled with lubricant under pressure from said pump, valvular means adapted to be closed while said chamber is being filled to prevent direct passage of lubricant through said cup and to be opened by the lubricant pressure in said chamber subsequent to reducing the pressure of the lubricant in said pipe system thereby to permit passage of a predetermined quantity of lubricant from said chamber to a part to be lubricated.

5. A lubricant cup for supplying a measured quantity of lubricant to a bearing and adapted for use in a centralized lubricating system having mechanism for intermittently increasing and relieving the pressure of the lubricant supplied to said cup, said cup comprising movable valve means for preventing direct passage of lubricant through said cup, means permitting passage of lubricant into said cup but preventing return thereof, said second mentioned means being independent of the position of said first mentioned means, and resilient storage means located between said two first mentioned means.

In testimony whereof, I have signed my name to this specification.

HOWARD J. MURPHY.